United States Patent
Shroff et al.

(10) Patent No.: US 11,634,272 B2
(45) Date of Patent: Apr. 25, 2023

(54) MOISTURE BARRIER PACKAGE (71) Applicant: UPL LTD, Haldia (IN)

(72) Inventors: Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 448 days.

(21) Appl. No.: 16/471,088

(22) PCT Filed: Dec. 18, 2017

(86) PCT No.: PCT/IB2017/058044
§ 371 (c)(1),
(2) Date: Jun. 19, 2019

(87) PCT Pub. No.: WO2018/116117
PCT Pub. Date: Jun. 28, 2018

(65) Prior Publication Data
US 2020/0115149 A1  Apr. 16, 2020

(30) Foreign Application Priority Data

Dec. 19, 2016 (IN) .............................. 201631043367

(51) Int. Cl.
B65D 85/82 (2006.01)
B65D 65/46 (2006.01)
(Continued)

(52) U.S. Cl.
CPC ............... B65D 85/82 (2013.01); B32B 7/02 (2013.01); B32B 15/09 (2013.01); B32B 15/20 (2013.01);
(Continued)

(58) Field of Classification Search
CPC .............. B65D 65/46; B65D 2565/387; B65D 75/38; B65D 77/04; B65D 85/82; B32B 15/06; B32B 15/08; B32B 15/082; B32B 15/085; B32B 15/088; B32B 15/09; B32B 15/20; B32B 2250/24; B32B 2250/40; B32B 2255/10; B32B 2255/205; B32B 2307/518; B32B 2307/7246; B32B 23/08;
(Continued)

(56) References Cited

U.S. PATENT DOCUMENTS 4,119,604 A  10/1978 Wysong
5,224,601 A   7/1993 Gouge et al.
(Continued)

FOREIGN PATENT DOCUMENTS

CA    2285202 A1   2/1999
JP    H05339106    12/1993
(Continued)

OTHER PUBLICATIONS

International Search Report and Written Opinion; International Application No. PCT/IB2017/058044; Internatinal Filing Date Dec. 18, 2017; dated Feb. 15, 2018; 11 pages.

Primary Examiner — Yan Lan
(74) Attorney, Agent, or Firm — Cantor Colburn LLP (57) ABSTRACT A packaged moisture sensitive product and a method for packaging a moisture sensitive product. The packaging comprises a primary package, and a secondary 5 package comprising a composite laminate comprising at least one thermoplastic layer and at least one metallic layer.

12 Claims, 2 Drawing Sheets (51) Int. Cl.
  *B65D 75/38* (2006.01)
  *B32B 15/09* (2006.01)
  *B32B 15/20* (2006.01)
  *B32B 27/08* (2006.01)
  *B32B 27/32* (2006.01)
  *B32B 7/02* (2019.01)

(52) U.S. Cl.
  CPC ............ *B32B 27/08* (2013.01); *B32B 27/32* (2013.01); *B65D 65/46* (2013.01); *B65D 75/38* (2013.01); *B32B 2250/40* (2013.01); *B32B 2307/7246* (2013.01); *B32B 2410/00* (2013.01); *B32B 2439/46* (2013.01); *B65D 2565/387* (2013.01)

(58) Field of Classification Search
  CPC ............ B32B 2410/00; B32B 2439/46; B32B 2553/00; B32B 25/042; B32B 25/12; B32B 27/08; B32B 27/28; B32B 27/281; B32B 27/283; B32B 27/285; B32B 27/286; B32B 27/288; B32B 27/302; B32B 27/304; B32B 27/306; B32B 27/308; B32B 27/32; B32B 27/322; B32B 27/34; B32B 27/36; B32B 27/365; B32B 7/00; B32B 7/02; B32B 7/04; B32B 9/02; B32B 9/045

See application file for complete search history.

(56) References Cited

U.S. PATENT DOCUMENTS

| | | | |
|---|---|---|---|
| 5,827,586 A | * | 10/1998 | Yamashita ................ B32B 7/12 428/36.6 |
| 9,224,601 B2 | | 12/2015 | Kadono |
| 2004/0031717 A1 | | 2/2004 | Edwards et al. |
| 2006/0293287 A1 | * | 12/2006 | Jadhav ................... A01N 57/28 514/114 |
| 2008/0226854 A1 | | 9/2008 | Trouilhet |
| 2015/0274408 A1 | | 10/2015 | Campbell et al. |

FOREIGN PATENT DOCUMENTS

| | | |
|---|---|---|
| JP | 2010047545 A1 | 3/2010 |
| JP | 2010264333 A | 11/2010 |
| WO | 199217382 A1 | 10/1992 |

* cited by examiner

MOISTURE BARRIER PACKAGE

CROSS REFERENCE TO RELATED APPLICATIONS

This application is a National Stage application of PCT/IB2017/058044, filed Dec. 18, 2017 which claims the benefit of Application No.: IN 201631043367, filed on Dec. 19, 2016, both of which are incorporated by reference in their entirety herein.

FIELD OF THE INVENTION

The present invention relates to a moisture barrier package. More particularly, the present invention relates to a moisture barrier package for moisture sensitive agrochemicals.

BACKGROUND AND PRIOR ART

Art essential prerequisite for selecting a packaging for moisture sensitive agrochemicals is to ensure that there is no interaction between the packaging material and the packaged material throughout the shelf life of the product. The conventional formulation types for agrochemicals are wettable powders, water dispersible granules, dusting powders and granules.

Polyethylene is used in agrochemical packaging because of its moisture barrier properties. However, polyethylene alone does not forth a sufficient packaging, for agrochemicals because of its poor mechanical strength.

Biaxially oriented polyester (PET) has been widely used for packaging of aqueous based products. However, Its Water vapour transmission rate is higher than that of polyethylene making it unsuitable for packaging moisture sensitive compounds.

US 2015 0274408, published on 1 Oct. 2015, discloses an agriculturally active product including a volume of material including an agriculturally active ingredient (acephate), and a package having a package centroid, an interior region, and a distant portion positioned farthest away from the package centroid, the interior region having art interior region centroid and containing the volume of material, the interior region centroid being spaced apart from the package centroid, by an offset distance, the distant portion being spaced apart from the package centroid by a farthest distance, a ratio of the offset distance to the farthest distance being greater than 0.10.

PCT Publication No. WO 1992 017392, published on 15 Oct. 1992, discloses a package containing an agrochemical which package comprises a first sheet of non-planar water soluble or water dispersible material and a second sheet of water soluble of water dispersible material superposed on the first sheet and sealed to it by a continuous closed water soluble or water dispersible seal along a continuous region of the superposed sheets. However, this package suffers from poor mechanical strength and often fells the drop test.

U.S. Pat. No. 5,224,501, published on 6 Jul. 1993, discloses a packaging system containing a pesticidal composition. The packaging system comprises a first sheet, of non-planar water soluble or water dispersible material defining a concavity enclosing the pesticidal composition, a second, sheet of water soluble or waiter dispersible material, sealed to the first sheet by a continuous closed water soluble or water dispersible heat seal, and a third sheet between the first and second sheets and sealed thereto by a water soluble or water dispersible seal to divide the package into two compartments.

CA 2 285 202, published on 2 Sep. 1999, discloses a system and method provided for storing an active ingredient such as a pesticide or other type of agricultural chemical in a water soluble package. The active ingredient is incorporated in a storage formulation including a hydrophilic, non-aqueous solvent which is capable of dissolving the active ingredient but not the water soluble package.

Acephate, O, S-dimethyl acetylphosphoraamidothioate, is an insecticide that is vulnerable to environmental moisture or moisture derived from the packaging material. Therefore, moisture resistant packaging of acephate or formulations containing acephate has been a long felt need in the art. The FAO specifications for packing acephate stipulate, that acephate must not contain more than 2 g/kg of water, as measured by MT. 30, CIPAC F, p. 91, The specification further stipulates that typically the water content should be about 1.5 g/kg. It further states that as acephate technical is hygroscopic, care must be taken to package it in moisture-proof containers and store in dry locations.

The present invention provides an effective moisture harrier packaging system for acephate and for acephate containing agrochemical products.

OBJECTS OF THE INVENTION

Therefore, an object of the present invention is to provide a moisture barrier packaging system for moisture sensitive agrochemicals.

Another object of the present invention is to provide a package for moisture sensitive agrochemicals that ensures no interaction, between the packaging material and the packaged material throughput the shelf life of the product.

Another, object of the present invention Is to provide a moisture barrier package for acephate on acephate containing agrochemical products.

The present invention described hereinafter meets at least one, and preferably more than one, of the above mentioned objects of the invention.

SUMMARY OF THE INVENTION

A packaged moisture sensitive product, said packaged product comprising:
(a) at least one moisture sensitive product;
(b) at least one primary package containing said moisture sensitive product, said primary package being a water soluble pouch made of a water soluble polymer selected from polyethylene glycol dr a block copolymer comprising polyethylene glycol selected from copolymers with polypropylene oxide, copolymers with polyethylene butylene, and copolymers with polycaprolactone; polyvinylpyrrolidone; polyvinyl alcohol; polyacrylic acid; polyacrylamides; N-(2-hydroxypropyl) methacrylamide; divinyl ether-maleic anhydride; polyoxazoline; polyphosphates; polyphosphazenes; xanthan gums; pectins; chitosan derivatives; dextran; carrageenan; guar gum; cellulose ethers selected from hydroxypropyl methylcelluose, hydroxypropyl cellulose, hydroxyethyl cellulose, and sodium carboxymethyl cellulose; and starch or starch derivatives;
(c) at least one secondary package capable of holding said primary package and being made of a composite laminate having a plurality of layers, said layers being selected from:

(i) at least one first layer of a thermoplastic polymer, said thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene sulphide, polyethersulphone, polyetherimide, and liquid crystal polymer;

(ii) at least one metallic layer disposed between said thermoplastic polymer layers of deposited on at least one of said thermoplastic polymer layer; and (iii) at least one second layer of a thermoplastic polymer, said thermoplastic polymer being, selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene sulphide, polyethersulphone, polyetherimide, end liquid crystal polymer.

A method of packing a moisture sensitive product, said method comprising:

(a) placing said moisture sensitive product within a first primary package, said primary package being a water soluble pouch made of a water soluble polymer selected from polyethylene glycol or a block copolymer comprising polyethylene glycol selected from copolymers with polypropylene oxide, copolymers with polyethylene butylene, and copolymers with polycaprolactone; polyvinylpyrrolidone; polyvinyl alcohol; polyacrylic acid; polyacrylamides; N-(2-hydroxypropyl) methacrylamide; divinyl ether-maleic anhydride; polyoxazoline; polyphosphates; polyphosphazenes; xanthan gums; pectins; chitosan derivatives; dextran; carrageenan; guar gum; cellulose ethers selected from hydroxypropyl methylcellulose, hydroxypropyl cellulose, hydroxyethyl cellulose, and sodium carboxymethyl cellulose; and starch or starch derivatives;

(b) placing said primary package in a secondary package capable of holding said moisture sensitive agrochemical product contained within said primary package, said secondary package being made of a composite laminate having a plurality of layers, said layers being selected from:

(i) at least one first layer of a thermoplastic polymer, said, thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene sulphide, polyethersulphone, polyetherimide, and liquid crystal polymer; and (ii) at least one metallic layer disposed between said thermoplastic polymer layers or deposited on at least one of said thermoplastic polymer layer; and (iii) at least one second layer of a thermoplastic polymer, said thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene sulphide, polyethersulphone, polyetherimide, and liquid crystal polymer.

DETAILED DESCRIPTION OF THE INVENTION

Surprisingly, the present inventors have now found that the combination of at least one water soluble polymer layer, at least one first thermoplastic layer, at least one metallic layer and at least one second thermoplastic layer provides surprising mechanical strength to a package intended for a moisture sensitive agrochemical product along with providing the requisite moisture resistance to the packaged agrochemical. More surprisingly, it was found that, the increased mechanical strength and the moisture resistance were prejudiced when, any one of the water soluble polymer layer, or any of the thermoplastic layers or the metallic layer was absent from the packaging. It was unexpected that the described layers, in combination, provided surprising benefits to a packaged agrochemical product that was otherwise very sensitive to environmental moisture exposure.

Therefore, in an aspect, the present invention provides a packaged moisture sensitive product, said packaged product comprising:

(a) at least one-moisture sensitive product;

(b) at least one primary package containing said moisture sensitive product, said primary package being a water-soluble pouch made of a water soluble polymer selected from polyethylene glycol or a block copolymer comprising polyethylene glycol selected from copolymers with polypropylene oxide copolymers with polyethylene butylene, and copolymers with polycaprolactone; polyvinylpyrrolidone; polyvinyl alcohol; polyacrylic acid; polyacrylamides; N-(2-hydroxypropyl) methacrylamide; divinyl ether-maleic anhydride; polyoxazoline; polyphosphates; polyphosphazenes; xanthan gums; pectins; chitosan derivatives; dextran, carrageenan; guar gum; cellulose ethers selected from hydroxypropyl methylcellulose, hydroxypropyl cellulose, hydroxyethyl cellulose, and sodium carboxymethyl cellulose; and starch or starch derivatives;
(c) at least one secondary package capable of holding said primary package and being made of a composite laminate having a plurality of layers, said layers being selected from:
(I) at least one first layer of a thermoplastic polymer, said thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl, siloxane, polyoxymethylene, polycarbonate, polyetheretherketone, nylon 6, polyphenylene sulphide, polyethersulphone, polyetherimide, and liquid crystal polymer;
(II) at least one metallic layer disposed between said thermoplastic polymer layers or deposited on at least one of said thermoplastic polymer layer; and
(III) at least one second layer of a thermoplastic polymer, said thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene sulphide, polyethersulphone, polyetherimide, and liquid crystal polymer.

In another aspect, the present invention also provides a method of packing a moisture sensitive product, said method comprising:
(a) placing said moisture sensitive product within a first primary package, said primary package being a water soluble, pouch made of a water soluble polymer selected from polyethylene glycol or a block copolymer comprising polyethylene glycol selected from copolymers with polypropylene oxide, copolymers with polyethylene butylene, and copolymers with polycaprolactone; polyvinylpyrrolidone; polyvinyl alcohol; polyacrylic acid; polyacrylamides; N-(2-hydroxypropyl) methacrylamide; divinyl ether-maleic anhydride; polyoxazoline; polyphosphates; polyphosphazenes; xanthan gums; pectins; chitosan derivatives; dextran; carrageenan; guar gum; cellulose ethers selected from hydroxypropyl methylcelluose, hydroxypropyl cellulose, hydroxyethyl cellulose, and sodium carboxymethyl cellulose; and starch or starch derivatives;
(b) placing said primary package in a secondary package capable of holding said, moisture sensitive agrochemical, product contained within said primary package, said secondary package being made of a composite laminate having a plurality of layers, said layers being selected from:
(I) at least one first layer of a thermoplastic polymer, said thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene, sulphide, polyethersulphone, polyetherimide, and liquid crystal polymer;
(II) at least one metallic layer disposed between said thermoplastic polymer layers or deposited on at least one of said thermoplastic polymer layer; and
(III) at least one second layer of a thermoplastic polymer, said thermoplastic polymer being selected from polyamideimide, polyethersulphone, polyetherimide, polyarylate, polysulphone, polyarylate, polysulphone, polyamide, polymethylmethacrylate, polyvinyl chloride, acrylonitrile butadiene styrene, polystyrene, polyetheretherketone, polytetrafluoroethylene, polyamide 6-6, polyamide 11, polyphenylene sulphide, polyethylene terephthalate, polyoxymethylene, polypropylene, high density polyethylene, low density polyethylene, polypropylene, polystyrene, polymethylmethacrylate, polyvinyl chloride, natural rubber, polydimethyl siloxane, polyoxymethylene, polycarbonate, polyetheretherketone, nylon 6, polyphenylene sulphide, polyethersulphone, polyetherimide, and liquid crystal polymer.

Both of these aspects, may have several embodiments depending on the preferential selection of the water soluble polymer or either of the thermoplastic layers or of the metallic layer. These embodiments, described hereinafter are non-limiting and are only intended to be the exemplary embodiments of the present invention.

Therefore, in an embodiment, the present invention provides a packaged moisture sensitive product, said packaged product comprising:
(a) at least one moisture sensitive product;
(b) at least one primary package containing said moisture sensitive product, said primary package being a water soluble pouch made of polyvinyl alcohol;
(c) at least one secondary package capable of holding said primary package and being made of a composite laminate having a plurality of layers, said layers being selected from:
(i) at least one first layer of polyethylene terephthalate;
(ii) at least one aluminium layer disposed between polyethylene terephthalate layers or deposited on at least one of said polyethylene terephthalate layer, and
(iii) at least one second layer of polyethylene terephthalate.

In another embodiment, the present invention also provides a method of packing a moisture sensitive product, said method comprising:

(a) placing said moisture sensitive product within a first primary package, said, primary package, being a water soluble pouch made of polyvinyl alcohol;
(b) placing said primary package in a secondary package capable of holding said moisture sensitive agrochemical product contained within said primary package, said secondary package being made of a composite laminate having a plurality of layers, said layers being selected from:
  (i) at least one of first layer of polyethylene terephthalate;
  (ii) at least one aluminium layer disposed between polyethylene terephthalate layers of deposited on at least one of said, polyethylene terephthalate layer; and
  (iii) at least one second layer of polyethyleneterephthalate.

In another embodiment, the present invention provides a packaged moisture sensitive product, said packaged product comprising:
(a) at least one moisture sensitive product;
(b) at least one primary package containing said moisture sensitive product, said primary package being a water soluble pouch made of polyvinyl alcohol;
(c) at least one secondary package capable of holding said primary package and being made of a composite laminate having a plurality of layers, said layers being selected from:
  (i) at least one first layer of polyethylene terephthalate;
  (ii) at least another second layer of polyethylene terephthalate;
  (iii) at least one aluminium layer disposed, between, polyethylene, terephthalate layers or deposited on at least one of said polyethylene terephthalate layer; and
  (iv) at least one layer of low density polyethylene.

In a preferred embodiment, the secondary package is a trilaminated layer comprising 12 micron polyethylene terephthalate, followed by another layer of 12 micron polyethylene terephthalate, a 8 micron aluminium foil/layer, followed, by a 100 micron low density polyethylene layer.

In another embodiment, the present invention also provides 5 method of packing a moisture sensitive product, said method comprising:
(a) placing said moisture sensitive product within a first primary package, said primary package being a water soluble pouch made of polyvinyl alcohol;
(b) placing said primary package in a secondary package capable of holding said moisture sensitive agrochemical product contained within said primary package, said secondary package being made of a composite laminate having a plurality of layers, said layers being selected from;
  (i) at least one first layer of polyethylene terephthalate;
  (ii) at least another second layer of polyethylene terephthalate;
  (iii) at least one aluminium layer disposed between polyethylene terephthalate layers or deposited on at leapt one of said polyethylene terephthalate layer; and
  (iv) at least one layer of low density polyethylene.

In a preferred embodiment, the secondary package is a trilaminated layer comprising 12 micron polyethylene terephthalate, followed by another layer of 12 micron polyethylene terephthalate, a 8 micron aluminium foil/layer, followed, by a 100 micron low density polyethylene layer.

In another embodiment the secondary package is a trilaminated layer comprising 12 micron polyethylene terephthalate, a 20 micron aluminium foil/layer, followed by a 85 micron tow density polyethylene layer.

Thus, in another embodiment, the present invention provides a packaged moisture sensitive, product said packaged product comprising:
(a) at least one moisture sensitive product;
(b) at least one primary package containing said moisture sensitive, product said primary package being a water soluble pouch made of polyvinyl alcohol;
(c) at least one secondary package capable of holding said primary package and being made of a composite laminate having a plurality of layers, said, layers being selected from:
  (i) at least one layer of polyethylene terephthalate;
  (ii) at least one aluminium layer disposed between polyethylene terephthalate layers or deposited on at least one of said polyethylene terephthalate layer; and
  (iii) at least one layer of low density polyethylene.

In another embodiment, the present invention also provides a method of packing a moisture sensitive product, said method comprising:
(a) placing said moisture sensitive product within a first primary package, said primary package being a water soluble pouch made of polyvinyl alcohol;
(b) placing said primary package in a secondary package capable of holding said moisture sensitive agrochemical product contained within said primary package, said secondary package being made of a composite laminate having a plurality of layers, said layers being selected from:
  (i) at least one layer of polyethylene terephthalate;
  (ii) at least one aluminium layer disposed between polyethylene terephthalate layers or deposited on at least one of said polyethylene terephthalate layer; and
  (iii) at least one layer of low density polyethylene.

In an embodiment, the moisture sensitive agrochemical product is a phosphoramidothioate insecticide selected from the group consisting of acephate, chloramine phosphorus, isocarbophos, isofenphos, isofenphos-methyl, methamidophos, phosglycin and propetamphos.

In another embodiment, the moisture sensitive agrochemical product is acephate or a formulation comprising the same.

In an embodiment, the moisture sensitive agrochemical product is acephate 97% dry flowable formulation.

Thus, a moisture resistant packaging for 10 kg acephate 97% dry flowable formulation was prepared. A description of the preferred embodiments follows hereinafter, which is not to be considered as limiting.

In an embodiment, the water soluble polymer layer is a water soluble pouch made up of polyvinyl alcohol.

In an embodiment, the water soluble pouch is sealed on a plurality of sides, preferably sealed on two or three sides.

In an exemplary embodiment, the water soluble layer is selected with the following specifications, which were selected for packaging a 10 kg sample of acephate 97% DF formulation. These specifications are exemplary and are not to be construed as limiting the present invention.

| S No. | Parameter | Unit | Exemplified selection |
|---|---|---|---|
| 1 | Height of pouch (±2 mm) | mm | 700 |
| 2 | Width of pouch(±2 mm) | mm | 460 |
| 3 | Total thickness (min) | µ | 52-58 |
| 4 | GSM of Film (major) | g/mt$^2$ | 60-70 |
| 5 | Tensile Strength (Min) | N/mm$^2$ | 34 |
| 6 | Elongation (Min) | % | 290 |
| 7 | Sealing Area | mm | 4-5 |
| 8 | Moisture @ 50% RH, 23° C. (Max.) | % | 5 |
| 9 | Dissolution Time at 30° C. | S | 180 |
| 10 | Drop Test | — | Pouch should pass drop, test from 1.0 meter height consist. of 2 drops |

In an embodiment, the secondary packaging layer is a 4-layer composite layer comprising the following layers: Printed PET (12µ)//PET (12µ)//Al foil (9µ)//LDPE (100µ)

In an exemplary embodiment, the secondary packaging is selected with the following specifications, which were selected for packaging a 10 kg sample of acephate 97% DF formulation. These specifications are exemplary and are not to be construed as limiting the scope of the invention in any manner.

| S No. | Parameter | Unit | Exemplified selection |
|---|---|---|---|
| 1 | Height of pouch or Repeated length (±2 mm) | mm | 670 |
| 2 | Over all Width of laminate (±2 mm) | mm | 1055 |
| 3 | Dimension of pouch After forming(major) | | 305 × 210 × 670 |
| 4 | Laminate GSM (±5%) | g/mt$^2$ | 157 |
| 5 | Heat Seal Strength | kg/15 mm | 3.5 |
| 6 | Bond Strength(Min.) | g/15 mm | 150 |
| 7 | Total thickness (min) | micron | 133 |
| 8 | Coefficient of friction (major) | | 0.25-0.3 |
| 9 | Workmanship (major) | | Pouch should be. properly sealed, without any weak sealing at closed end. The sealing and cutting should be proper. Pouch should not have any pinholes or cuts in foil as well as pouch. There shall be no delamination in the pouch. |
| 10 | Sealing width at all 4 corner (Included in size) (major) | mm | 10.0 |

The process for preparing such composite laminates is not particularly limiting, and these laminates may be prepared as per the conventional processes known in the art. For example, such laminates may be prepared by compression moulding, extrusion coating, extrusion lamination, tandem extrusion lamination, chemical vapour deposition etc. Such processes are commonly known in the art and are used for preparing the multi-layer laminates of the invention.

In an embodiment, a plurality of such secondary packages, each of said secondary packages comprising acephate 97% DF placed inside the primary package, were disposed within a tertiary packing, which comprises printed cartons.

In an embodiment, the printed carton is laminated with BOPP film for additional moisture resistance.

In a preferred, embodiment, the printed carton is laminated with 10µ BOPP film.

In an embodiment, the printed carton is provided with at least one die cut handle provided for easy handling.

In an embodiment, a plurality of such printed cartons are placed within a shipper packaging.

In an embodiment, the moisture sensitive material which are capable of being packed within the packaging method of the present invention includes, but is not limited to, acephate; combination of acephate and buprofezin; and combination of acephate and imidacloprid and compositions comprising the same.

Figure 1:
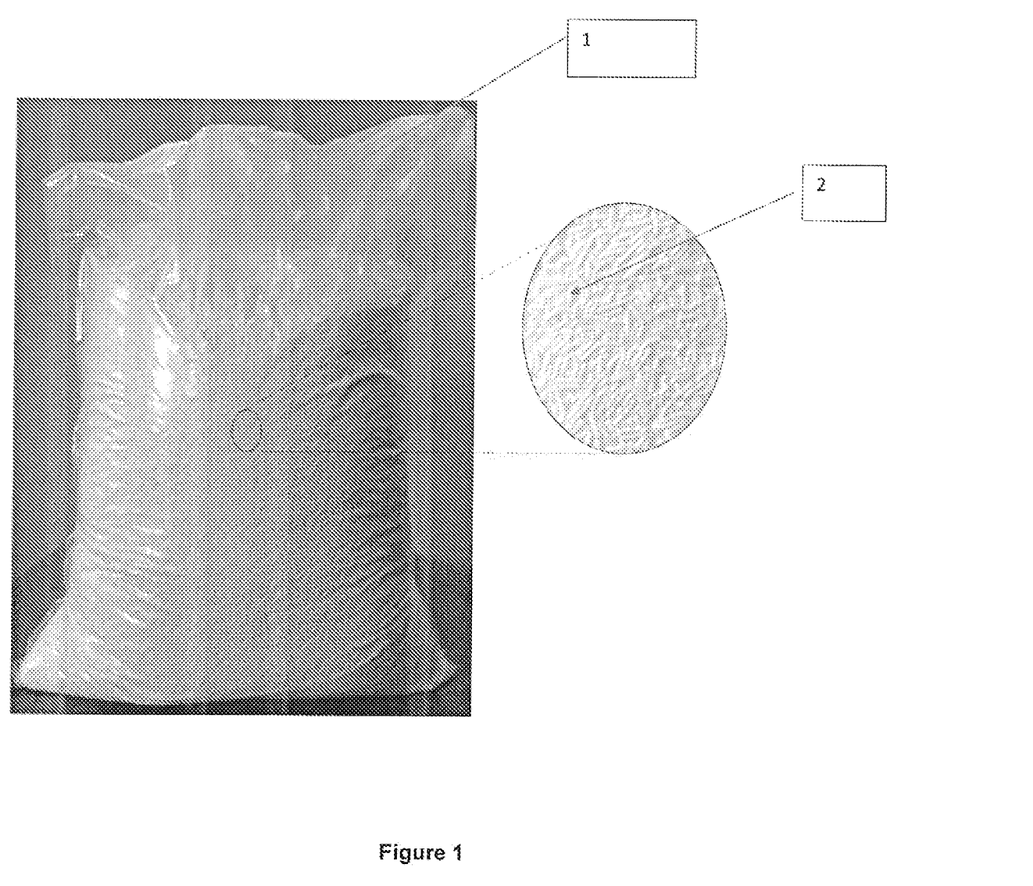

FIG. 1 demonstrates a water soluble pouch (1) made up of polyvinyl alcohol. The water soluble pouch (1) has been used for packaging a 10 kg sample (2) of acephate 0.97% DF formulation.

Figure 2:
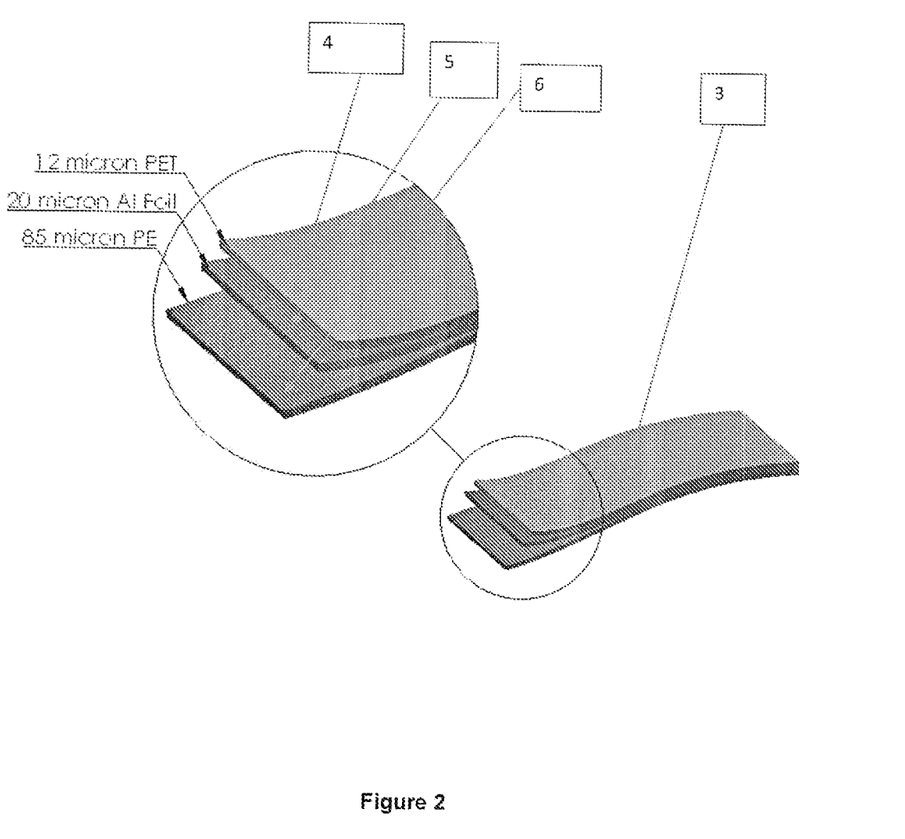

FIG. 2 demonstrates a secondary packaging layer (3) according to an exemplary embodiment of the present invention. The secondary packaging layer (3) includes a 3-layer composite layer comprising PET (4), Al foil (5) and LORE (6).

EXAMPLE 1

The tri-laminated pouch PET (24µ)//Al foil (9µ)//LDPE (100µ) along with the ID primary packaging layer of PVA was used to pack acephate 97% DF formulation. The package containing acephate 97% DF was then subjected to AHS study at 54° C.

| Sr. No. | TESTS | REQUIREMENTS | Ambient | 7 days | 14 days | 28 days |
|---|---|---|---|---|---|---|
| 1 | Description | The material shall be in, the form of white to off-white granules, free from any visible extraneous matter. | Complies | Complies | Complies | Complies |
| 2 | Acephate content % w/w | 97.0 ± 2.5 (94.5 To 99.5) | 97.39 | 97.08 | 96.51 | 95.47 |
| 3 | pH (1% Aq. Solution) | 3.5 To 6.5 | 5.51 | 5.25 | 4.88 | 4.19 |
| 4 | Water insoluble % w/w | 1.0 Max. | 0.19 | 0.19 | 0.18 | 0.20 |
| 5 | Wet Sieve % w/w Passing through 75 µ test sieve | 99.0 Min. | 99.92 | 99.92 | 99.91 | 99.90 |

| Sr. No. | TESTS | REQUIREMENTS | RESULTS | | | |
|---|---|---|---|---|---|---|
| | | | Ambient | 7 days | 14 days | 28 days |
| 6 | Solubility in 1% Aq. sol$^n$ | Should be clear solution | Complies | Complies | Complies | Complies |
| 7 | Moisture Content % w/w | Record | 0.18 | 0.19 | 0.21 | 0.26 |
| Degraded Acephate content in % -------> | | | — | 0.32 | 0.90 | 1.97 |

It was thus found that the packaged sample complied with the specifications up to 28 days in AHS study. AHS study is normally conducted for 14 days at an elevated temperature of 54° C., which according to standard guidelines, provides adequate data in certain circumstances to allow the regulatory authorities to make a regulatory finding regarding the stability of the product and the effect of the formulation on the product packaging.

COMPARATIVE EXAMPLE 2

The tri-laminated pouch PET (24μ)//Al foil (9μ)//LDPE (100μ) along with the primary packaging layer of PVA was used to pack Acephate 97% DF formulation available from UPL Ltd. In the comparative sample, the tri-laminate pouch was replaced with a laminate comprising polyethylene/EVOH layer without a metallic layer.

| Sr No | Parameters | Requirements | Initial Results | After 28days | |
|---|---|---|---|---|---|
| | | | | PE/EVOH | High Barrier Film Pouch |
| 1 | Description | The material shall be in the form of white to off white free flowing granules free from extraneous matter. | Complies | Compiles | Complies |
| 2 | Assay Of Acephate | 9.70% Min | 97.32 | 96.5 | 96.9 |
| 3 | PH (1% Aq. Soln) | 3.5 to 4.5 | 4.42 | 3.60 | 3.44 |
| 4 | Material insoluble in water | 1.0 Max | 0.22 | 0.24 | 0.24 |
| 5 | Wet Sieve Test thru 75 micron Sieve (200 BSS) | 99.0 Min | 99.91 | 99.9 | 99.91 |
| 6 | Moisture Content | — | 0.19 | 0.21 | 0.20 |

It was found that there was 0.84% reduction in the percentage active ingredient of acephate in the PE/EvOH (Ethylene Vinyl Alcohol) pouch, whereas only about 0.43% degradation in acephate content in the tri-laminated pouch of the invention. The PE/EvOH pouch, without the metallic layer, also led to highly corrosive smell generated in the pouch.

COMPARATIVE EXAMPLE 3

The acephate+imidacloprid formulation lancer Gold®, available from UPL Ltd, was tested for storage stability in a comparative high barrier film pouch made of 100 micron low density polyethylene. Thus, the test package wad absent of the water soluble polymeric pouch, the thermoplastic layer and the metallized layer. The storage stability of the formulation was tested after AHS storage i.e. after 28 days at 54° C.

| S No. | Parameters | Requirements | T = 0 day | T = 28 days |
|---|---|---|---|---|
| | | | High barrier flim pouch (100 mic LDPE) | |
| 1 | Description | White/off-white free flowing powder | Complies | |
| 2 | Acephate assay | 50.0 ± 5% | 51.6 | 50.1 |
| 3 | Imidacloprid assay | 1.80 ± 5% | 2.11 | 1.40 |
| 4 | pH (2% aq Soln.) | 3.0 to 6.0 | 5.44 | 3.24 |
| 5 | Water content | 1.5 Max | 0.35 | 0.77 |
| 6 | Wettability | 120 Max | 72 | 76 |
| 7 | Wet sieve test (75 micron, 200 BSS) | 99.0 min | 99.7 | 99.62 |

Thus, it was found that in the absence of the secondary package and the water soluble polymer of the present invention, acephate content of Lancer Gold® degraded by 2.90% after 28 days, and the imidacloprid content degraded by 33.5% when packed in high barrier film pouch of 100 micron LDPE. A highly corrosive smell was also generated in the pouch. A packaging method and the packaged product according to the present invention was required to pack acephate or acephate containing formulation.

While the foregoing written description of the invention enables one of ordinary skill to make and use what is considered, presently to be the beat mode thereof, those of ordinary skill will understand and appreciate the existence of variations, combinations, end equivalents of the specific embodiment, method, and examples herein. The invention should therefore not be limited by the above described embodiment, method, and examples, but by all embodiments and methods within the scope and spirit of the invention.

The invention claimed is:

1. A packaged moisture sensitive product, said packaged product comprising:
   (a) at least one moisture sensitive product;
   (b) at least one primary package containing said moisture sensitive product, said primary package being a water soluble pouch made of polyvinyl alcohol; and
   (c) at least one secondary package capable of holding said primary package and being made of a composite laminate having a plurality of layers, said layers comprising:

at least one first layer of a thermoplastic polymer, said thermoplastic polymer being polyethylene terephthalate;

at least one second layer of a thermoplastic polymer, said thermoplastic polymer being a low density polyethylene; and at least one metallic layer disposed between the first layer and the second layer, wherein the moisture sensitive product is a moisture sensitive agrochemical product comprising a phosphoramidothioate insecticide selected from the group consisting of acephate, chloramine phosphorus, isocarbophos, isofenphos, isofenphos-methyl, methamidophos, phosglycin and propetamphos.

2. The packaged product as claimed in claim 1, wherein the moisture sensitive agrochemical product comprises acephate.

3. The packaged product as claimed in claim 2, wherein the moisture sensitive agrochemical product is an acephate 97% dry flowable formulation or an acephate 50%+imidacloprid 1.8% SP formulation.

4. The packaged product as claimed in claim 1, wherein the second layer is a low density polyethylene layer having a thickness of 85 microns or 100 microns.

5. The packaged product as claimed in claim 1, wherein the first layer has a thickness of 12 microns, the second layer has a thickness of 85 microns, and the metallic layer has a thickness of 20 microns.

6. A packaged moisture sensitive product, said packaged product comprising:
(a) at least one moisture sensitive product;
(b) at least one primary package containing said moisture sensitive product, said primary package being a water soluble pouch made of polyvinyl alcohol; and
(c) at least one secondary package capable of holding said primary package,
wherein said secondary package is a composite laminate having a plurality of layers, said layers being:
at least a first layer of polyethylene terephthalate;
at least a second layer of polyethylene terephthalate deposited on the first layer of polyethylene terephthalate;
at least one aluminium layer deposited on the second layer of polyethylene terephthalate layer; and
at least one layer of low density polyethylene deposited on the aluminium layer;

wherein the moisture sensitive product is a moisture sensitive agrochemical product comprising a phosphoramidothioate insecticide selected from the group consisting of acephate, chloramine phosphorus, isocarbophos, isofenphos, isofenphos-methyl, methamidophos, phosglycin and propetamphos.

7. The packaged product as claimed in claim 6, wherein the first layer of polyethylene terephthalate has a thickness of 12 microns, the second layer of polyethylene terephthalate has a thickness of 12 microns, the aluminium layer has a thickness of 8 or 9 microns, and the layer of low density polyethylene has a thickness of 100 microns.

8. A method of packing a moisture sensitive product to prepare the packaged moisture sensitive product of claim 1, said method comprising:
placing said moisture sensitive product within said first primary package; and
placing said primary package in said secondary package capable of holding said moisture sensitive agrochemical product contained within said primary package.

9. The method as claimed in claim 8, wherein:
said primary package is a water soluble pouch made of polyvinyl alcohol;
said secondary package is a composite laminate having a plurality of layers, said layers being:
at least one first layer of polyethylene terephthalate;
at least a second layer of polyethylene terephthalate disposed on the first layer of polyethylene terephthalate;
at least one aluminium layer deposited on the second layer of polyethylene terephthalate; and
at least one layer of a low density polyethylene deposited on the aluminium layer.

10. The method as claimed in claim 8, wherein the moisture sensitive agrochemical product comprises acephate.

11. The method as claimed in claim 10, wherein the moisture sensitive agrochemical product is an acephate 97% dry flowable formulation or an acephate 50%+imidacloprid 1.8% SP formulation.

12. The packaged product as claimed in claim 6, wherein the layer of low density polyethylene has a thickness of 100 microns.

* * * * *